United States Patent
Häggman

(10) Patent No.: US 6,520,899 B1
(45) Date of Patent: Feb. 18, 2003

(54) METHOD AND DEVICE FOR FEEDING BLANKS

(75) Inventor: Jaako Häggman, Helsinki (FI)

(73) Assignee: UPM-Kymmene Corporation, Helsinki (FI)

(*) Notice: Subject to any disclaimer, the term of this patent is extended or adjusted under 35 U.S.C. 154(b) by 0 days.

(21) Appl. No.: 09/717,165

(22) Filed: Nov. 20, 2000

Related U.S. Application Data

(63) Continuation of application No. PCT/FI99/00398, filed on May 12, 1999.

(30) Foreign Application Priority Data

May 20, 1998 (FI) .................................................. 981122

(51) Int. Cl.[7] .................................................. B31B 1/90
(52) U.S. Cl. ........................ 493/105; 493/124; 493/126; 493/164
(58) Field of Search .............................. 493/105, 124, 493/123, 125, 126, 164; 156/218, 449

(56) References Cited

U.S. PATENT DOCUMENTS

| | | | |
|---|---|---|---|
| 4,285,750 A | 8/1981 | Demantino | |
| 4,544,431 A | * 10/1985 | King | 156/449 |
| 4,718,961 A | * 1/1988 | Yamato et al. | 156/218 |
| 5,120,292 A | 6/1992 | Ueda et al. | |
| 5,910,228 A | * 6/1999 | Atkinson et al. | 156/449 |

FOREIGN PATENT DOCUMENTS

| | | |
|---|---|---|
| EP | 131101 | 1/1985 |
| EP | 417864 | 3/1991 |

OTHER PUBLICATIONS

Search Report from PCT/FI99/00398.

* cited by examiner

Primary Examiner—Eugene Kim
Assistant Examiner—Sameh Tawfik
(74) Attorney, Agent, or Firm—Fitch, Even, Tabin & Flannery

(57) ABSTRACT

In the method for feeding blanks in the container-forming unit, the blank is advanced onto the wrapping mandrel which is attached to a moving structure, which moves the wrapping mandrel between the different processing stations of the container-forming unit. Blanks are advanced as a continuous blank web to the wrapping mandrel of the wrapping station, where they are detached from the end of the blank web and advanced onto the wrapping mandrel. The blank web is fed by means of a conveyor situated before the detachment point in the feeding direction by steps corresponding to the length of a blank, and after each feeding movement a blank is detached from the end of the blank web.

5 Claims, 4 Drawing Sheets

METHOD AND DEVICE FOR FEEDING BLANKS

This is a continuation of application Serial No. PCT/FI99/00398, filed May 12, 1999.

FIELD OF THE INVENTION

The object of this invention is a method for feeding blanks of the type presented in the preamble to claim 1. The object of this invention is also a device for feeding blanks of the kind presented in the preamble to claim 8.

The object of this invention is a method for feeding blanks of the type presented in the preamble to claim 1. The object of this invention is also a device for feeding blanks of the kind presented in the preamble to claim 8.

BACKGROUND

It is known to use liquid packaging paperboard for the manufacture of cylindrical containers having an upright cylindrical body formed by joining the opposed vertical edges of a blank provided with a heat-sealable coating and having end closure members secured to the upper and lower open ends of the body, the upper end closure Member having a hole covered with, for example, an openable closure cap or closure strip. Containers of this type are used for the sterile and airtight packaging of different beverages.

It is known to use liquid packaging paperboard for the manufacture of cylindrical containers having an upright cylindrical body formed by joining the opposed vertical edges of a blank provided with a heat-sealable coating and having end closure members secured to the upper and lower open ends of the body, the upper end closure member having a hole covered with, for example, an openable closure cap or closure strip. Containers of this type are used for the sterile and airtight packaging of different beverages.

The container into which the packaged substance, such as a drink, is fed at a latter stage, is manufactured automatically in a package forming unit consisting of a series of so-called mandrels around which the body part is formed by wrapping. The mandrels are arranged in a rotating structure, which transfers the mandrels from one processing station to another. At these stations, specific operations are carried out one at a time, thus resulting step by step in a can-like casing which, at the last processing station, is disengaged from the mandrel and transferred to the filling unit for filling and closing.

The apparatuses discussed above are known to a person skilled in the art and they are described, for example, in European patents EP-B1-0 038 488 and EP-B1-0 018 470. It is especially characteristic of the methods presented in these patents to wrap the blank around the mandrel by using a mechanical pressing member which presses one edge of the blank against the side surface of the mandrel and moves with the mandrel's rotation, which pulls the blank around the mandrel to form a closed structure, after which the sides are sealed.

U.S. Pat. No. 4,318,703 also discloses a method in which sidewall blanks are fed in succession onto a wheel consisting of radially projecting mandrels. One after another, the blanks are transferred from a stockpile on a conveyor in a horizontal position through a heating station, where hot air is blown from opposite sides onto the edges of the blanks, after which they are fed one at a time onto a mandrel which has rotated to the feeding position, and are then wrapped around the mandrel. U.S. Pat. No. 4,490,130 discloses a rotation wheel that transfers the blanks in succession through the side edge heating unit prior to the wrapping stage. The publication EP-B1-0 456 011 discloses a similar principle of blank pre-heating, in which rectangular-shaped sheets are cut from a continuous blank strip, and after the cutting unit, the blank sheets advance in succession on a conveyor in a horizontal position through an edge heating unit before the blanks are wrapped about the mandrels.

Feeding separate blanks into the forming unit requires accurate timing and accurate positioning of the blanks at the mandrels before wrapping. In a rotating structure it is typical that the mandrels come to the wrapping unit at intervals of less than one second, for example 0.5 seconds, which requires reliable functioning of the actuators and of their control, since when the mandrel rotates to the wrapping unit, the blank must be ready in the right position with respect to the mandrel.

SUMMARY

This invention relates to a method that can simplify the feeding of the blank to the wrapping unit and ensure that the blanks are brought at the speed required by the rotation speed of the mandrels to the right position at the wrapping unit. What is mainly characteristic of the method in order to achieve this is described in the characterising part of the claim 1. The blanks are brought in the form of a continuous web to the wrapping station, where they are detached, for example by cutting, and transferred onto the wrapping mandrel. A continuous blank web is more easily controlled, and its transfer can be arranged in a downward direction, which saves space in the horizontal direction. The edge of the blank web is advanced to the proximity of the wrapping mandrel perpendicularly to the mandrel's axial direction in such a way that it is aligned, at least partly, with the mandrel, after which a blank of a specific length is detached from the web, the blank being then immediately ready to be pushed into contact with the side surface of the mandrel by one direct movement at a right or a slightly oblique angle to the blank's longitudinal direction. The detachment point on the web is at a distance determined by the length of the blank and at this point a detachment means operates, which has been programmed to cut the web along a line across its longitudinal direction, The detachment means is most preferably a cutting means, which cuts the web by a stroke directed towards at its surface.

This invention relates to a method that can simplify the feeding of the blank to the wrapping unit and ensure that the blanks are brought at the speed required by the rotation speed of the mandrels to the right position at the wrapping unit. What is mainly characteristic of the method in order to achieve this is described in the characterising part of the claim 1. The blanks are brought in the form of a continuous web to the wrapping station, where they are detached, for example by cutting, and transferred onto the wrapping mandrel. A continuous blank web is more easily controlled, and its transfer can be arranged in a downward direction, which saves space in the horizontal direction. The edge of the blank web is advanced to the. proximity of the wrapping mandrel perpendicularly to the mandrel's axial direction in such a way that it is aligned, at least partly, with the mandrel, after which a blank of a specific length is detached from the web, the blank being then immediately ready to be pushed into contact with the side surface of the mandrel by one direct movement at a right or a slightly oblique angle to the blank's longitudinal direction. The detachment point on the web is at a distance determined by the length of the blank and at this point a detachment means operates. which has been programmed to cut the web along a line across its longitudinal direction. The detachment means is most preferably a cutting means, which cuts the web by a stroke directed towards at its surface.

As to the other advantageous embodiments of the invention, reference is made to the accompanying dependent patent claims and to the description that follows.

BRIEF DESCRIPTION OF THE DRAWINGS

The more detailed ensuing description of the invention is made with reference to the accompanying drawings, in which.

DETAILED DESCRIPTION

In this context, the different parts of the container are referred to by the following names:

Container: sales package or casing according to the context.

Sales package: the finished liquid package that has been filled and closed.

Casing: an unfilled and unclosed outer surface of the sales package.

Can: a package which is characterised in that it comprises a part wrapped to form a structure which is closed in the cross section perpendicular to the longitudinal axis, or a sidewall blank of which one end or both ends have been closed with end members.

Container blank: a straight planar piece, usually of liquid packaging board, which is combined with other similar pieces to form the casing and which can be detached from a larger area of material, for example a long strip.

Outer surface of blank or blank material: the surface which forms the outer surface of the container and which is usually provided with printing and a heat-sealable coating.

Blank material: the raw material for the blanks, usually liquid packaging board covered with a heat-sealable coating.

Figure 1:
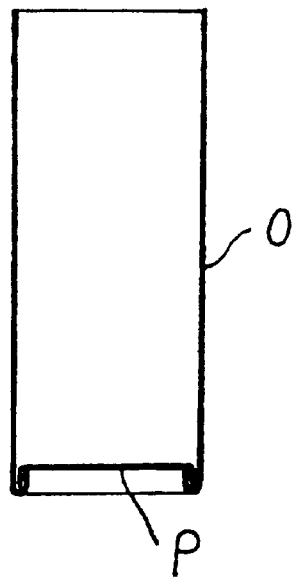
FIG. 1 shows a longitudinal section of the can that forms a part of the container.

The packaging machine has a container-forming unit in which is formed the upright part, the body O, of the can-like casing, shown in FIG. 1, which in its horizontal section has the form of a closed structure, and whose open end is closed with the end member P. The can-like container thus formed, still having one open end, is advanced to the filling unit of the packaging machine, where the final sales package is formed and whose function will not be discussed here in more detail.

Figure 2:
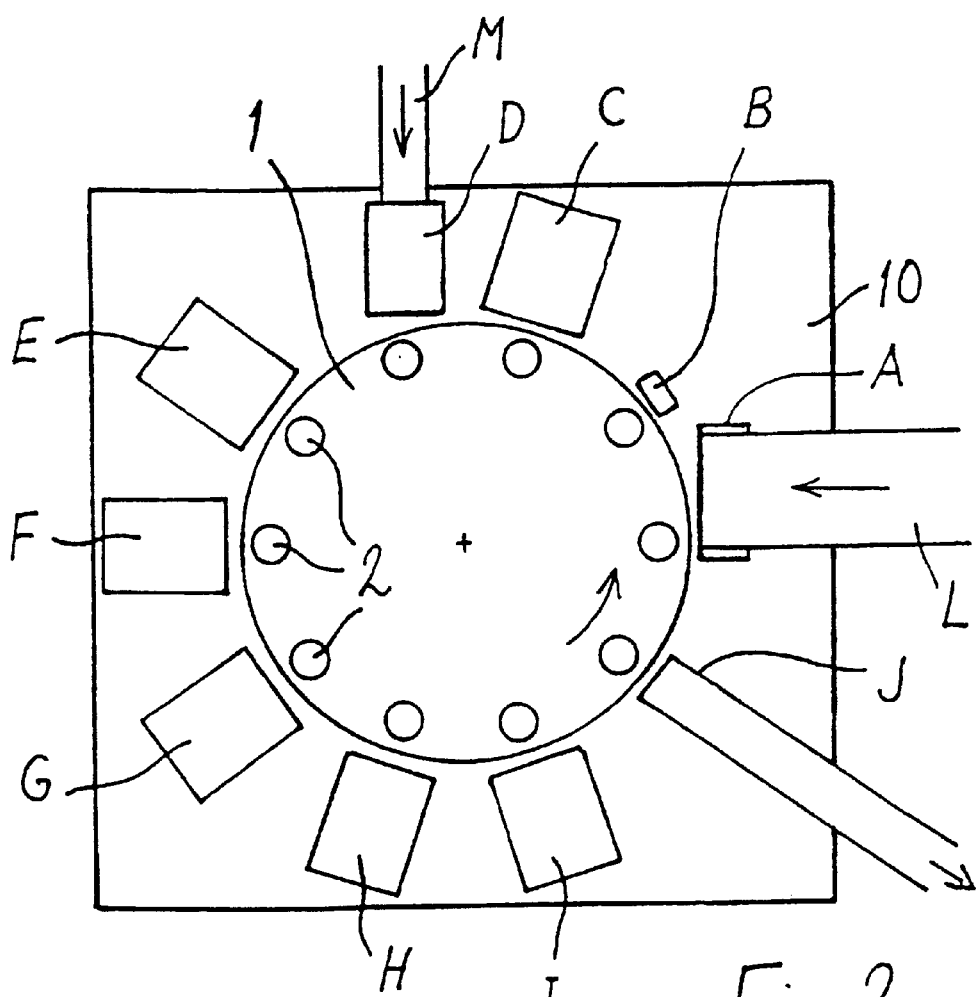
FIG. 2 is a view from above of the container-forming station, in which an apparatus provided by the present invention is used.

The container-forming unit illustrated in FIG. 2 has a horizontally turning transfer table 1, around whose periphery are arranged at fixed angular intervals forming dies, which support the above-mentioned container at its different forming stages. The forming dies are identical to one another and are each formed of an upright mandrel 2, around which the sidewall blank for the casing is wrapped, and which shall be later referred to as the wrapping mandrel.

In addition to the transfer table 1, the container-forming unit includes a solid frame, to which the turning table is attached and which is referred to generally by the number 10. The frame incorporates a number of wrapping mandrels 2 that equals the number of processing stations, at each of which a specific stage of forming the container, which still has one open end, takes place. At the stop stage, when all of the stations complete certain operational phases, the mandrels are at the processing stations and at the transfer stage, they advance by a short rotation of the table equal in length to the distance between the wrapping mandrels 2, to the next station for the succeeding processing stage.

The following is a more detailed description of the different processing stations mainly according to their functions in the forming of the can-like casing. All of the stations have parts attached to the frame 10, which with their movement or other action perform the desired operational stages. The moving parts of the frame are mainly situated outside the circular track of the mandrels and/or above the mandrels or in a way that they are temporarily in the track of the mandrels and that they move out of the way of the mandrels during the transfer stage. FIG. 2 does not illustrate these different parts in more detail, but it shows the supporting structures of different stations, to which the above-mentioned functional parts are attached.

At the wrapping station A, a blank of a certain height is cut according to the invention from the lower edge of the blank web, which has been advanced to the station with the transfer devices attached to the frame, and the blank is then pushed into contact with the wrapping mandrel 2 and wrapped around it to the shape determined by the outer surface of the mandrel. Consequently, the body of the can-like casing is formed, which in horizontal section has a closed perimeter, a round shape if the mandrels are cylindrical. This stage and the structure in question will be discussed hereinafter.

At the sidewall sealing station B, the sidewall margins, which have been made to overlap at the wrapping station, are sealed together permanently. This is done with the help of a clamp that presses the overlapping portions together, at the same time cooling down the heat-seal coating on the inner surface of the blank, which has previously been heated to bonding temperature.

At the preheating station C, hot air is blown inside the side sealed part at its upper end, which causes the heat-seal coating on the inner surface of the blank to heat up to a suitable temperature at these points.

At the end member station D, end members, whose perimeter matches the form of the body in horizontal section, are detached by die cutting from the continuous web fed to the station, and the members are then forced through a hole causing its outer edges to fold at the same time. After this, the member is pushed downwards onto the open upper end of the sidewall blank against the end face of the wrapping mandrel which acts as a countersurface, so that the upwards folded edges of the end member are pressed against the inner surface of the body.

At the first heating station E, hot air is blown onto the outer surface of the end member directing it towards the edges, whereupon the lower surface of the member heats up at the edge which is folded up against the inner surface of the upper end of the body.

At the second heating station F, the same treatment is carried out so that the whole perimeter of the upper end is heated up sufficiently.

At the clenching station G, the upper edge of the sidewall blank, which is above the folded edge of the end member, is pressed from above towards the centre and down, thus folding it over the turned up edge of the end member.

At the first end sealing station H, the skirt of the body is pressed against the upward folded edge of the end member, and the heat-sealable coatings, which were heated at the previous heating stages, cause the parts to adhere, and the folded outer edge of the end member remains permanently inside the upper edge, which is folded to a U-shape.

At the second end sealing station 1, the same operational phases are carried out at different points than at the previous station to ensure a uniform seal around the whole perimeter of the already finished can-like casing.

At the last processing station, the container release station J, the can-like casing is lifted up off the wrapping mandrel 2, and transferred on a conveyor track to the filling unit of the packaging machine.

After the finished casing has been removed from the wrapping mandrel 2, a short rotation of the table 1 moves the mandrel back to the wrapping station A to receive a new sidewall blank for the body, after which the above described processing stages are repeated.

The typical processing times at each station A-J may be in the range of 500 ms, including the transfer from one station to the next. This means that the container-forming unit is capable of manufacturing a can in approximately 5 seconds, giving a capacity of 1 can/0.5 s, i.e. 120 cans/min.

Figure 3:
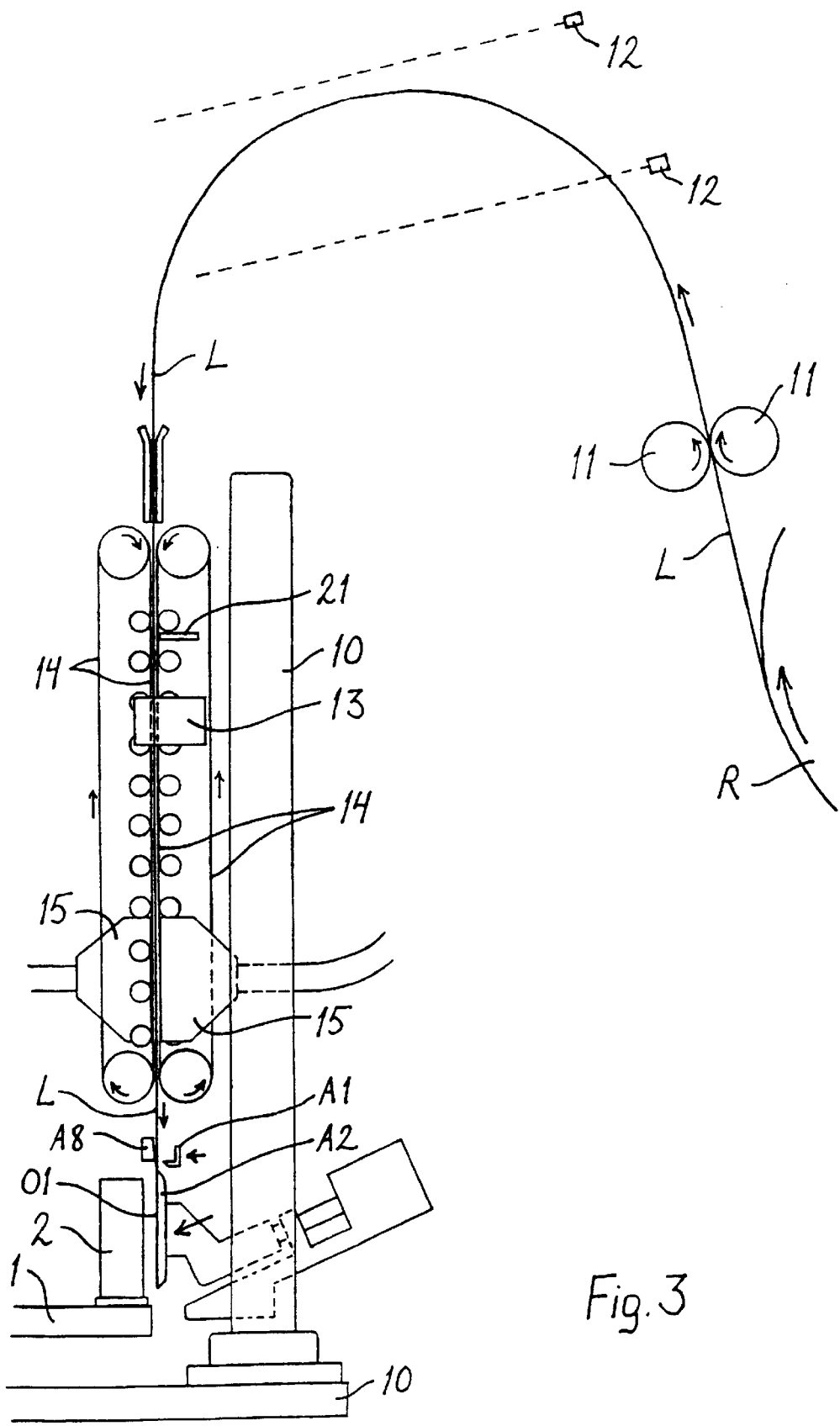
FIG. 3 is a side view of the apparatus.

FIG. 3 illustrates a device of according to invention that feeds blanks to the wrapping station A, where the blanks are advanced onto the wrapping mandrels 2 which have been brought to the wrapping station, and are wrapped around them.

The blanks that form the outer sidewalls of the casings are brought as a continuous blank material of liquid packaging board, such as a blank web L, from a stock reel R guided by two rolls 11, which advance the blank web between them towards the wrapping station A. Before advancing down towards station A the web L forms an upward-curving loop, whose height is controlled by means of photocells 12. When the height of the loop has descended to the level controlled by the lower photocell, more web is fed upwards by turning one of the rolls 11, the driven roll, until the height of the loop reaches the level controlled by the upper photocell.

After the loop stage, the web is advanced with the help of a guiding means onto a vertical transfer track. The web L travels straight down to the wrapping station A carried by a conveyor attached to the pillar 22, which is attached to the frame of the packaging unit. The conveyor is formed by transfer belts 14, through which the web L is guided. There are two pairs of transfer belts near the outer edges of the web L, and each pair supports the web from opposite sides with the help of idlers against the rear surface of the belts. The belts may be timing belts and the idlers and drive wheels of the belts may correspondingly be gear wheels. In the vertical course of the web L there is also a notching device 13, which cuts notches in the edge of the blank web L at fixed distances corresponding to the cutting lines of the webs, in order to avoid overlapping of end folds. The printed marks on the web L are read by a photocell that controls the transfer belts 14 so that the notching points are correctly positioned. This device that reads the printed marks is marked with the reference number 21.

At the height of the transfer belts, the frame of the unit is equipped with heating devices 15, such as air nobles, which heat up the outer edges of the blank web at the surfaces that come together at the seam at the wrapping stage, i.e. one edge is heated on the outer and the other on the inner surface of the blank. In this way, the heat sealable coating on the inner and outer surfaces of the blank heats up to the appropriate temperature. The openings of the nozzles are placed next to the transfer belts 14 facing the marginal portions of the web. Since the blank web L is moved down in impulses by the transfer belts 14, when stopped the web is always heated over a certain distance in height, and this is a sufficient height for the blank to be cut. Each of the nozzles is placed so that it directs hot air onto the blank web surface between the cutting lines, leaving the cutting area unheated so that coating softened by the heating will not hamper the cutting. The height of the area heated by the nozzles can be set to equal the height of the blanks, for example, a multiple of the height of the blank to be heated, and in this case as well, the air coming from the nozzles is directed in such a way that the cutting areas remain unheated.

The blank web L is advanced and stopped by the transfer belts 14 so that its lower edge reaches the appropriate height for blank cutting and that the part above the lower edge comes within the range of the pusher plate A2 behind it and, at the same time, holding suction is exerted on the blank through the suction openings (not shown) on the surface of the pusher plate.

Below the transfer belt pairs, at the wrapping station A and above the pusher plate A2. which moves back and forth, the frame is equipped with a cutter consisting of a straight sharp blade, which cuts a blank O1 of a specific height from the lower edge of the blank web along a horizontal cutting line by one stroke, which is aimed in the direction of the wrapping mandrel against the outer surface of the blank web and which ends against the solid surface A8. The blank O1 forms a body of a specific shape in its horizontal section, the form being defined by the wrapping mandrel 2 which is brought to the wrapping station A, and which will be described more specifically later. As mentioned, the lower edge of the blank, which is also the cutting line, is correctly positioned before the cutting. In practice, this is carried out with the help of the printed mark, the photocell that detects it and the transfer belts 14.

The edges are heated early enough before cutting, so that the cutting blade is not subjected to too much heat, which could cause alterations in it. In FIG. 3, the nearest heating point is at least the height of one blank away from the cutting point.

It is possible to use the conveyor to transfer the web back, which means upwards, whenever the production of casings is temporarily stopped or no blanks are needed at the wrapping station.

Figure 4:
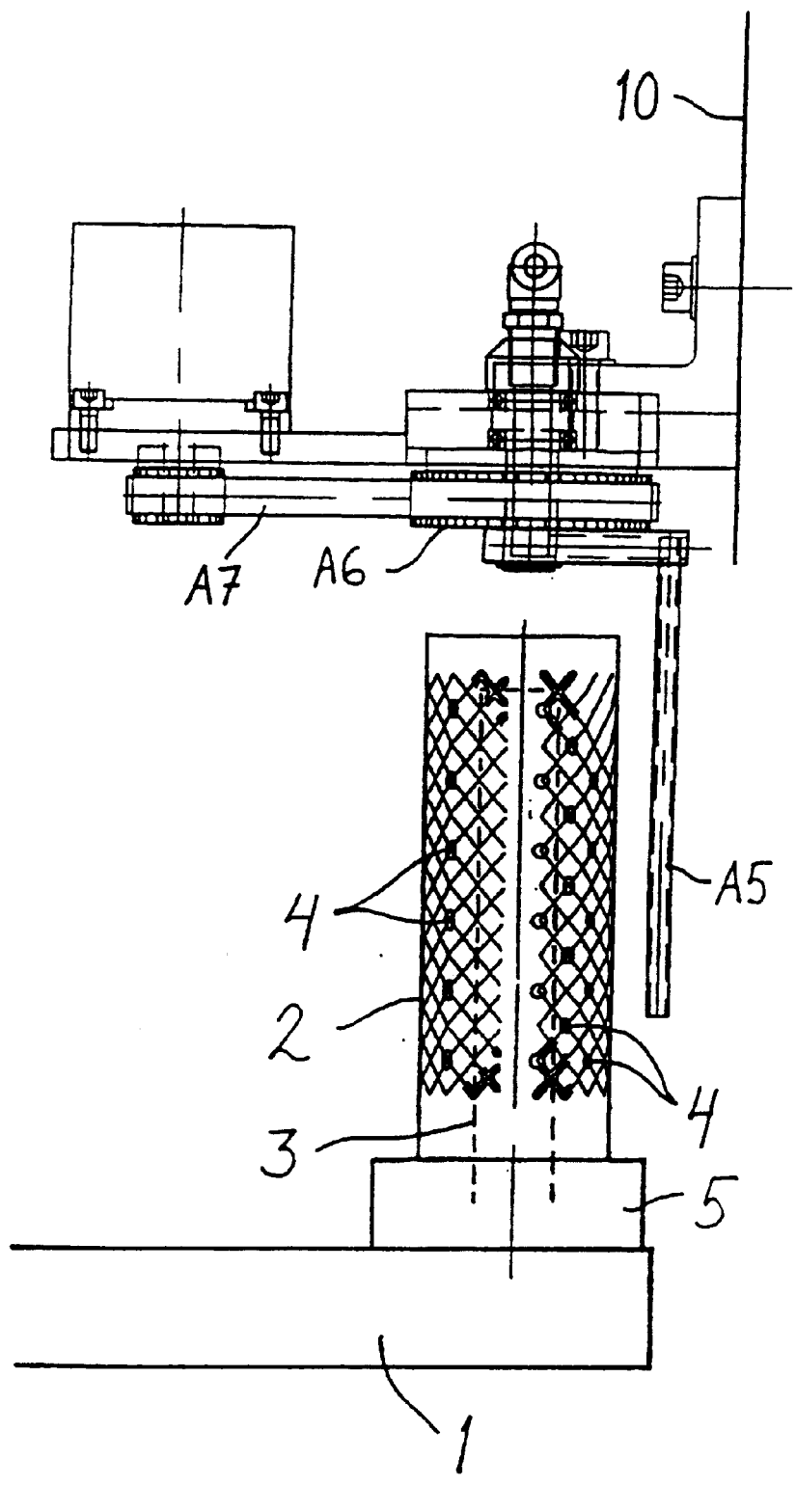
FIG. 4 is a side view of the wrapping mandrel and of the auxiliary wrapping device.

FIG. 4 is a more detailed illustration of the wrapping mandrel 2, around which the body O is formed. The wrapping mandrel 2 corresponds in its shape the form of the inner surface Of the container and its surface is provided with openings which are connected to the suction duct 3 brought from below, enabling the suction of the blank O1 against the wrapping mandrel. The openings are arranged around the whole perimeter of the mandrel and at different heights in relation to the mandrel's longitudinal axis, in order to exert suction on the whole outer surface of the mandrel. The suction duct 3 forms a hollow space inside the mandrel where the suction is supplied according to an arrangement described later, and from which the bore holes ending at the openings 4 branch out radially. There is also a separate cooling medium duct system (not shown) in the suction mandrel between the hollow space and the outer surface.

The edge of the blank web L is advanced as close as Possible against the mandrel 2, so that after cutting the distance to bring the blank into contact with the mandrel will be short. The distance is Preferably less than 5 cm and most Preferably less than 2 cm. The pusher plate 42 gives a short Push to the blank O1 pushing it towards the wrapping mandrel 2, While at the same time the holding suction holds the blank to its front surface, after which one vertical margin of the blank touches the Outer surface of the mandrel. The pusher surface of the plate as well as the blank are parallel to the mandrel surface with which the blank first comes into Contact, but the Pushing movement is directed obliquely downwards (arrow), which ensures enough space for different structures in front of the cutting line so that these structures are not in the way of the blank and so that the wrapping mandrel 2 can be at the same time brought close to the pusher plate. The movement of the pusher plate A2 can also be directed horizontally, that is at a right angle to the outer surface of the mandrel 2, The surface of the pusher plate's marginal area A3, behind the blank O1, which surface presses the edge portion of the blank against the mandrel 2, is concave in its horizontal section, matching the outer surface of the mandrel, so as to bring the edge of the blank in a small sector against the mandrel, already at this stage, Simultaneously, the suction of the openings 4 provided in this area of the mandrel cause the blank O1 to remain attached by its edge to the mandrel. After the pusher plate has pressed the blank against the mandrel 2, the holding suction on the front surface of the plate stops. Next, the pusher plate withdraws back to the initial position, where the lower end of the blank web L can be advanced from above in front of the plate for a new blank to be detached and pushed.

Figure 5:
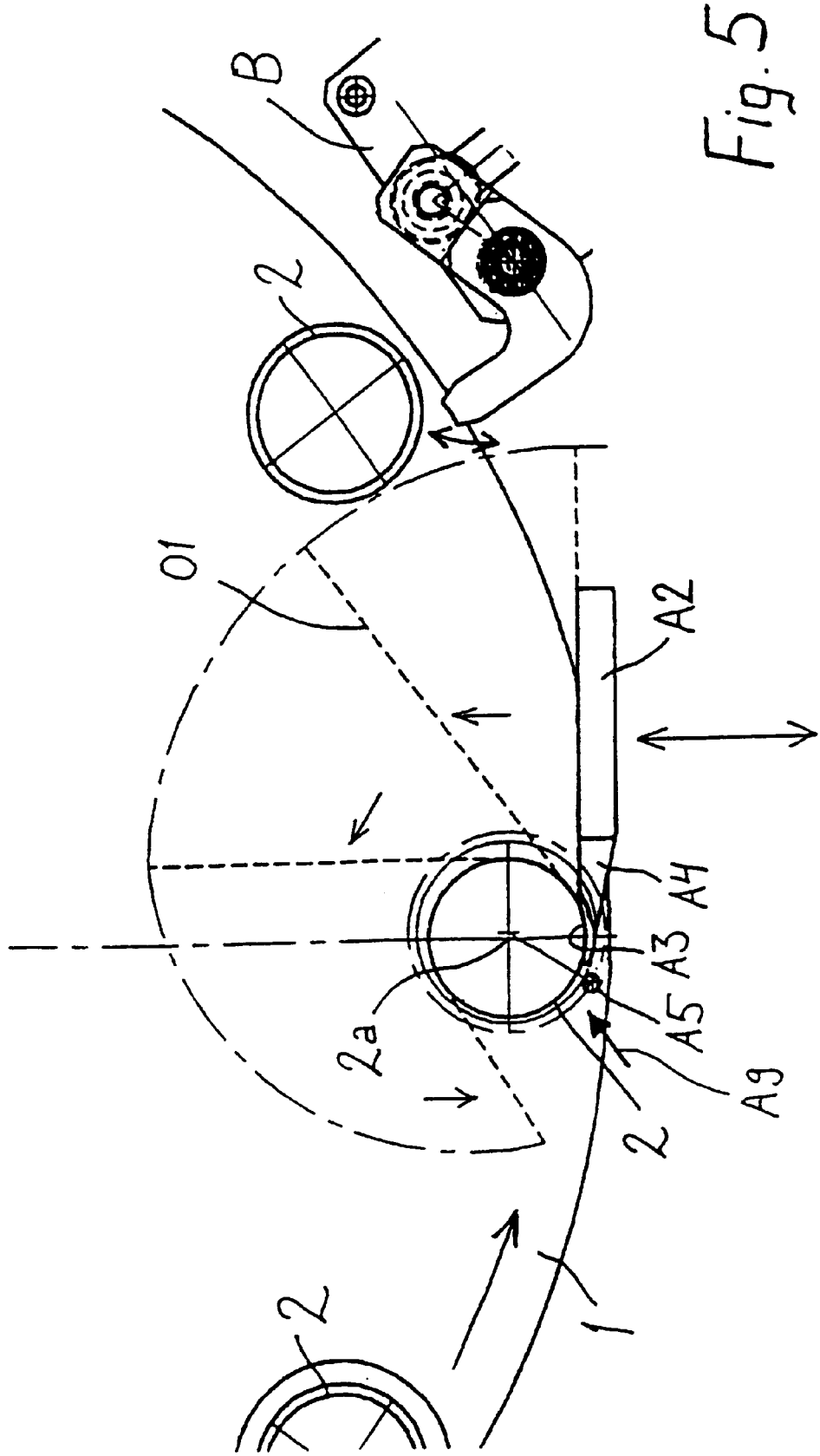
FIG. 5 is a schematic illustration of the stage of forming the containers body.

FIG. 5 is a schematic representation in horizontal cross section of the progress of the blank wrapping stage. The blank O1 which is held by suction to the mandrel 2 by one of its edges, is wrapped one turn around the mandrel 2, as the suction from the openings 4 which are arranged in succession in the direction of the mandrel's perimeter, pulls the free part of the blank O1 closer to the mandrel and against its outer surface. Consequently, the entire inner surface of the blank is held against the outer surface of the mandrel 2. At the same time, the sealable coating on the other free vertical margin of the blank O1, which has been heated by the heating devices 15, is made to overlap with the first vertical margin, which is in the same way sealable, thus giving the body of the casing the shape determined by the outer surface of the mandrel. The width of the blank O1, that is the distance between the vertical margins, has naturally been proportioned to the diameter of the mandrel in such a way that the overlapping section on the blank's margins is wide enough to ensure the durability of the seal.

The openings 4 are arranged on the outer surface of the mandrel 2 in such a way that, viewed in the horizontal cross section, they are appropriately distributed around the whole perimeter of the mandrel and they are also distributed densely enough along the length of the mandrel, covering its whole surface area. Furthermore, the openings 4 are connected to grooves made on the surface in order to allow suction to be exerted also in the areas between the openings (FIG. 4). This structure creates strong suction, which may in itself be sufficient to draw the inner surface of the blank O1 tightly against the outer surface of the mandrel. Given that the suction force can be reasonably low at first and that it increases as the blank which is being wrapped around the mandrel gradually covers more openings, it might be advisable, especially in the case of wrapping a rigid blank material around the mandrel 2, to use auxiliary devices, such as jets of air directed from outside onto the part of the blank that is not in contact with the mandrel 2, in order to push the blank against the mandrel 2, or alternatively to use mechanical means. The purpose of these would only be to help to bring the blank that is not in contact with the mandrel's outer surface closer to the mandrel 2, because the final pressing against the mandrel will be performed by suction. These auxiliary forces directed at the outer surface of the blank are illustrated with arrows in FIG. 5. In the case where jets of air are used, at least a part of the jet can be created with the help of blowing nozzles provided on the pusher plate A2 on an area of the plate that is behind the portion of the blank that is not into contact with the mandrel, or the nozzles can be attached to the pusher plate outside the surface that pushes the blank O1, whereby if they are located on the sides of the plate they are easy to focus in a suitable direction. The blowing nozzles are connected to a compressed air supply and they can begin to function as soon as the holding suction of the pusher plate stops.

The following is a description of a mechanical auxiliary wrapping means. After the pusher plate A2 has pushed the blank's O1 edge against the mandrel, an upright securing arm A5 rotating around the mandrel moves in the pushing direction from behind the pusher plate A2 through a vertical hole A4 therein onto the outer surface of the blank and by rotating around the mandrel 2 forces the blank O1 closer against it. The hole A4 is for the most part of the height of the pusher plate and it separates, from the rest of the pusher plate A2 provided with holding suction, the aforementioned strip provided with a concave surface A3, which presses the edge of the blank against the mandrel. Immediately after the securing arm A5 has advanced in front of the pusher plate A2, the pusher plate can return backwards to its initial position. As illustrated in FIG. 4, the securing arm A5 is attached to a rotating structure A6 situated above the mandrel 2, this structure being for example a wheel turned by belt transmission or by other means so that the vertical rotation axis determines the orbit of the arm around the mandrel 2. The arm's orbit, illustrated by a broken line in FIG. 5, may be eccentric to the centric longitudinal axis 2a of the mandrel, so that the other edge, the free edge of the blank, remains long enough outside the orbit to enable the arm to press the blank closer to the mandrel. The orbit is also arranged so that at the point where only a small section of the blank is free from the mandrel, the orbit of the securing arm A5 is closest to the mandrel 2 in order to ensure that the free vertical margin folds over the vertical margin first pushed against the mandrel. At this point, the orbit can pass the outer surface of the mandrel 2 almost at a tangent. After the securing arm AS has completed a full circle and has pressed the free margin of the blank against the first margin at the sealing point, it returns to a position where it will not obstruct a new mandrel moving to the wrapping station A to receive a new blank O1 pushed by the pusher plate A2. It is, however, possible that the securing arm is in contact with the blank only at the early stage of wrapping, because as the openings 4 are gradually covered around the perimeter, the suction effect also increases. In this case, the securing arm A5 can remain straight in its initial position inside the track of the mandrels 2.

In FIG. 5, there is also an arrow A9 that illustrates an air impingement directed in the wrapping direction onto the surface of the mandrel before the sealing point in order to ensure that the final section of the blank O1 is properly wrapped against the mandrel and overlaps the other edge of the blank. This impingement, which can be a narrow jet of air of a certain height produced by a nozzle or a set of nozzles, can be used especially alongside mechanical auxiliary wrapping means.

After the blank O1 has been attached to the outer surface of the mandrel 2 in the above described manner, the mandrel advances with the blank around it along a horizontal track to the next station, the sidewall sealing station B, where the cooled vertical surface is pressed with a horizontal movement against the sealing point causing the surfaces of the blank's marginal portions to press tightly against each other, and the heat-sealable coating on the inner surface of the other edge, the free edge of the blank cools down rapidly, making the seal durable and thus forming the body O. At the next stages, the end of the body O wrapped around the mandrel 2 is supplied with an end member, which is pressed from above over the opening with a closed horizontal section at the top end of the blank.

Suction is generated in the mandrel by arranging the suction duct 3, which is connected with the openings 4, to extend as suction duct 3 which passes through the transfer table 1 and opens up on the bottom surface of the table. A stationary suction member, made for example of plastic, is attached to the frame of the container-forming unit against the bottom surface of the table, the member being provided with a suction chamber which is in connection with the suction. At the same time as the wrapping mandrel 2 advances to the wrapping station A to receive the blank O1 the suction duct 3, which passes through the transfer table 1, moves into alignment with the suction chamber of the suction member and suction is immediately exerted in the mandrel 2.

The blank web L can also be advanced to the wrapping station in other directions besides the vertical one. This idea can, for example, be applied to container-forming units where the wrapping mandrel of the wrapping station is horizontal, in which cases the web can be advanced horizontally, so that its edge comes opposite the wrapping mandrel. Transfer devices and edge heating units situated on the track of the web, similar to the types described above, can be used to transfer and to stop the web. Also the transfer of the web into contact with the wrapping mandrel 2 can be performed in one straight transfer movement directed against the plane of the blank, in other words a short push from behind the blank as described earlier. Inclined transfer tracks are also possible if they are practical with regard to the position of the blank detached from the edge of the web.

What is claimed is:

1. A method for feeding blanks in a container-forming unit to a wrapping station, wherein a blank is advanced onto a wrapping mandrel which is attached to a moving structure that transfers the wrapping mandrel between different processing stations of the container-forming unit, wherein the blanks are advanced as a continuous blank web to meet the wrapping mandrel in the wrapping station where they are detached from the end of the blank web and transferred onto the wrapping mandrel, wherein the blank web is transferred to the wrapping station from above, wherein at least one side margin of the blank web is heated in the same direction with the feeding of the blank web before the detachment point, wherein the blank web is fed by steps corresponding to the length of the blank in the direction of feed by a conveyor situated before the detachment point, and that after each feeding movement a blank is detached from the end of the blank web, wherein after a blank has been detached, it is advanced, by one straight transfer motion directed against the plane of the blank, into contact with the wrapping mandrel.

2. The method as described in claim 1 wherein the end of the blank web is held by suction during the detachment of a blank.

3. The method as described in claims 2 wherein a blank is detached with a cutting stroke directed against the surface of the web.

4. An apparatus to feed blanks to a wrapping station in a container-forming unit, which incorporates means for advancing a blank onto a wrapping mandrel attached to a moving structure, which transfers the wrapping mandrel between different Stations of the container-forming unit wherein the apparatus feeds a continuous blank web to the wrapping station, and the apparatus comprises means for detaching a blank from an end of the blank web at the wrapping station, wherein a track along which the continuous blank web is fed is directed downwards to the wrapping station from above, wherein there is a heating devise before the detachment point at both sides of the track along which the blank web is fed, whereby the heating devices on opposite sides are arranged to heat up opposite surfaces of the blank web and the area heated by the heating device is equal to at least the length of the side seal of the casing to be manufactured from the blank, wherein on a transfer track of the blank web in the feeding direction before the detachment point, there is a conveyor which feeds the blank web by steps corresponding to the length of a blank and the conveyor consists of members that are in contact with the surface of the blank web on both sides for a certain length, wherein situated before the conveyor, there are feeding devices which feed the blank web distances longer than the length of one blank, wherein the detachment means for detaching a blank consist of a cutter, which cuts the blank web with a stroke directed against the surface, wherein the means for moving a blank onto the wrapping mandrel consists of a pusher plate, which moves back and forth and with a forward-directed pushing movement pushes the detached blank towards the outer surface of the wrapping mandrel.

5. The apparatus as described in claim 4 wherein the pusher plate is provided with suction.

* * * * *